(12) United States Patent
Thomas et al.

(10) Patent No.: US 7,856,723 B2
(45) Date of Patent: Dec. 28, 2010

(54) FOOTPLATE

(75) Inventors: Roger Thomas, Stockton-on-Tees (GB);
Scott Keenlyside, Auckland Park (GB);
Joanne Rogers, Bishop Auckland (GB)

(73) Assignee: Black & Decker Inc., Newark, DE (US)

( * ) Notice: Subject to any disclaimer, the term of this patent is extended or adjusted under 35 U.S.C. 154(b) by 313 days.

(21) Appl. No.: 12/171,408

(22) Filed: Jul. 11, 2008

(65) Prior Publication Data
US 2009/0049972 A1   Feb. 26, 2009

(30) Foreign Application Priority Data
Jul. 26, 2007   (EP)   ................... 07113273

(51) Int. Cl.
*B23B 29/00* (2006.01)
*B23D 51/04* (2006.01)
(52) U.S. Cl. ................. 30/371; 30/373; 30/374; 30/293; 83/743; 83/745
(58) Field of Classification Search ........... 30/286, 30/371, 293, 373, 374–377; 409/178–180, 409/182, 210, 214, 218; 144/144.52, 145.1, 144/144.1, 137, 136.95; 83/743, 745, 574
See application file for complete search history.

(56) References Cited

U.S. PATENT DOCUMENTS

| | | | | | |
|---|---|---|---|---|---|
| 2,708,465 | A | * | 5/1955 | Huebner et al. | 83/745 |
| 3,298,407 | A | * | 1/1967 | Scott | 83/489 |
| 3,830,130 | A | * | 8/1974 | Moore | 83/745 |
| 3,903,774 | A | * | 9/1975 | Stinson | 83/471.2 |
| 4,202,233 | A | * | 5/1980 | Larson | 83/745 |
| 4,224,854 | A | * | 9/1980 | Malacheski et al. | 83/745 |
| 4,325,278 | A | * | 4/1982 | Beerens | 83/745 |
| 4,628,608 | A | * | 12/1986 | Kuhlmann et al. | 30/373 |
| 4,751,865 | A | * | 6/1988 | Buckalew | 83/745 |
| 5,044,075 | A | * | 9/1991 | Brennan et al. | 29/890.031 |
| 5,333,385 | A | * | 8/1994 | Chou | 30/371 |
| 5,454,167 | A | * | 10/1995 | Albery | 30/377 |
| 5,509,338 | A | * | 4/1996 | Ekker | 83/745 |
| 6,062,122 | A | * | 5/2000 | Niemczyk | 83/745 |

(Continued)

FOREIGN PATENT DOCUMENTS

DE   3606525 A1   9/1987

(Continued)

*Primary Examiner*—Boyer D Ashley
*Assistant Examiner*—Omar Flores-Sánchez
(74) *Attorney, Agent, or Firm*—Michael Aronoff; Adan Ayala (57) ABSTRACT

A footplate for a power tool for guiding the tool along a guide, the footplate having on its lower surface at least one dual-restriction, wherein the first part of the dual-restriction is for engaging a rail extending in a longitudinal direction of a first guide on the upper surface of said first guide and the second part of the dual-restriction is for engaging a rail extending in a longitudinal direction of a second different guide on the upper surface of said second guide, where the first and second parts of the or each dual-restriction each has a fixed side wall, and where the first and second parts of the or each dual-restriction have an adjustable side wall arranged opposite to a respective fixed side wall.

14 Claims, 12 Drawing Sheets

U.S. PATENT DOCUMENTS

| | | | |
|---|---|---|---|
| 6,173,631 B1 * | 1/2001 | Schock | 83/13 |
| 6,712,061 B1 * | 3/2004 | Kalb | 125/10 |
| 6,868,612 B2 * | 3/2005 | Ballard | 30/371 |
| 7,516,552 B2 * | 4/2009 | Yoshida | 30/373 |
| 7,610,839 B1 * | 11/2009 | Bessette | 83/743 |
| 7,621,206 B2 * | 11/2009 | Makropoulos | 83/574 |
| 2004/0168327 A1 * | 9/2004 | Kondo et al. | 30/371 |
| 2006/0283024 A1 * | 12/2006 | Wilson et al. | 30/374 |

FOREIGN PATENT DOCUMENTS

| | | |
|---|---|---|
| DE | 20017862 U1 | 2/2001 |
| DE | 20101525 U1 | 5/2001 |
| GB | 2204528 A | 11/1988 |

* cited by examiner

FOOTPLATE

CROSS-REFERENCE TO RELATED APPLICATIONS

This application claims priority under 35 U.S.C. §119 to European Patent Application No. 07113273.2 filed Jul. 26, 2007. The entire contents of that application are expressly incorporated therein by reference thereto.

FIELD OF THE INVENTION

The present invention relates to a footplate for a power tool that is designed for use with a guide which is to be positioned upon a workpiece. More specifically, the guide has a rail on its upper side and the footplate has on its lower side a channel for engagement of the rail, so that the tool may be positioned on the guide and guided along the rail when the rail engages the channel.

BACKGROUND AND SUMMARY OF THE INVENTION

A footplate disclosed in DE 200 17 862 U1 has one channel for engaging the rail of one type of guide. The channel has two restrictions, one located at each longitudinal end of the footplate. The width of each restriction is defined, on the one hand, by a fixed side wall in the channel and, on the other hand, by an adjustable side wall. The adjustable side wall may be adjusted transversely to the longitudinal direction by an adjustment mechanism thereby altering the width of the channel. The adjustment mechanisms are for fine-tuning clearance between the channel and the rail so that the footplate is guided along the guide without wobbling, as it were, in an exactly linear manner. These restrictions are referred to as "single-restrictions" because they can alter the width of only one channel.

A footplate disclosed in DE 36 06 525 has two channels on its lower side. Each channel can engage the rail of a different type of guide. The two channels are parallel to each other and are, in effect, two parts of a "dual-restriction", albeit a non-adjustable dual-restriction because it cannot alter the width of either channel.

The present invention relates to a footplate that has two channels. Each channel can engage the rail of a different guide. The object of the invention is to ensure exact linear guidance of the footplate no matter which guide is used.

The present invention is a footplate for a power tool for guiding the tool along a guide, the footplate comprising on its lower surface at least one dual-restriction, wherein the first part of each dual-restriction is for engaging a rail extending in a longitudinal direction of a first guide on the upper surface of said first guide and the second part of each dual-restriction is for engaging a rail extending in a longitudinal direction of a second different guide on the upper surface of said second guide, wherein the first and second parts of each dual-restriction each has a fixed side wall, and wherein the first and second parts of each dual-restriction have an adjustable side wall arranged opposite to a respective fixed side wall. The adjustable side walls may be parts of separate components or different sides of one component. The adjustable side walls can adjust the clearance at the dual-restriction to ensure linear guidance of the footplate along the guide.

Preferably, the width between the fixed and adjustable side walls, when measured in a direction transverse to the longitudinal direction, is adjustable by an adjustment mechanism. One adjustment mechanism per dual-restriction makes efficient use of the materials for making the footplate which reduces the cost and complexity of manufacturing.

Preferably, the adjustable side walls are both located between the fixed side walls. As such, the adjustable side walls are adjacent each other and in the middle of the dual-restriction. This close proximity makes the adjustable side walls easily accessible to the adjustment mechanism.

Preferably, the adjustment mechanism comprises a rotatable eccentric element located between the adjustable side walls. As such, the eccentric element can adjust the width between fixed and adjustable side walls simply by rotating about its own axis. Naturally, the width between fixed and adjustable side walls of the first part of the dual-restriction can only increase while the width between fixed and adjustable side walls of the second part of the dual-restriction decreases, and vice versa. This is not important because the footplate is normally only used with one guide with one type of rail at any one time.

Preferably, the adjustable side walls are opposing sides of a perimeter wall surrounding the eccentric element. This dispenses with the need for additional components between the eccentric element and the rail of the guide upon which the footplate is positioned. In other words, the perimeter wall of the eccentric element slides directly against the rail.

Preferably, the perimeter wall is a cylindrical wall arranged eccentrically in relation to the axis of rotation of the eccentric element. This ensures that the eccentric element can adjust and fine-tune the width between fixed and adjustable side walls gradually and precisely.

Preferably, the eccentric element is secured to the footplate by a fixing bolt connected to a bearing portion of the footplate, wherein the fixing bolt can be unfastened or fastened to enable or disable rotation of the eccentric element, respectively. The fixing bolt performs the function of rotational axis and fastening means for the eccentric element. This is a simple and inexpensive means of enabling or disabling rotation of the eccentric element.

Preferably, the adjustment mechanism comprises a manually accessible actuating member for rotating the eccentric element. As such, the eccentric element can be easily manipulated by the user of the tool. The actuating member may take the form of a knurled, cylindrical knob.

Preferably, the eccentric element can be rotated 360°. This facilitates easy use by left-handed and right-handed users of the tool.

Alternatively, the adjustment mechanism comprises two arms, each arm arranged at one end to pivot about a common pivot point so that an open mouth may be formed at the other ends of the arms, and a wedge arranged to move within the mouth according to the position of a control device, whereby movement of the wedge into the mouth forces the arms to pivot apart to reduce the width between the fixed and adjustable side walls, and whereby movement of the wedge away from the mouth allows the arms to pivot closer to each other to increase the width between the fixed and adjustable side walls. As a result of its wedge action this design of adjustment mechanism has the advantage of being highly resistant to any external forces changing the position of the adjustable side walls.

Preferably, each arm of the alternative design of adjustment mechanism has a shoulder and one shoulder protrudes away from the other shoulder in the transverse direction, whereby one shoulder is the adjustable side wall of the first part of the dual-restriction and the other shoulder is the adjustable side wall of the second part of the dual-restriction.

Preferably, the control device of the alternative design of adjustment mechanism is a grub-screw threadedly engaged with an externally accessible hole in the footplate, whereby rotation of the grub-screw into the footplate moves the wedge into the mouth and whereby rotation of the grub-screw out of the footplate allows the wedge to move out of the mouth. More preferably, each arm is biased to pivot towards the other arm.

BRIEF DESCRIPTION OF THE DRAWINGS

The embodiments of the invention will be described with reference to the drawings, in which.

DETAILED DESCRIPTION OF THE INVENTION

Figure 1:
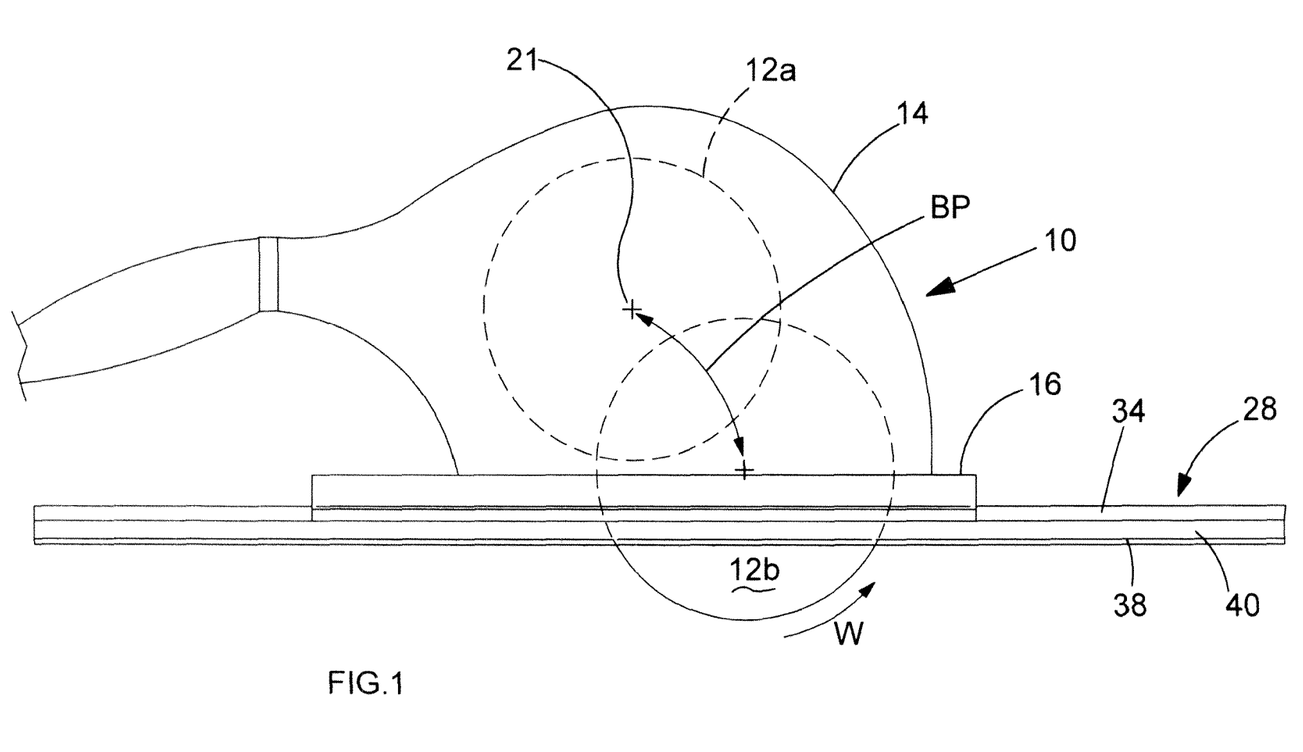
FIG. 1 is a schematic side view of a plunge saw upon a guide.
Figure 2:
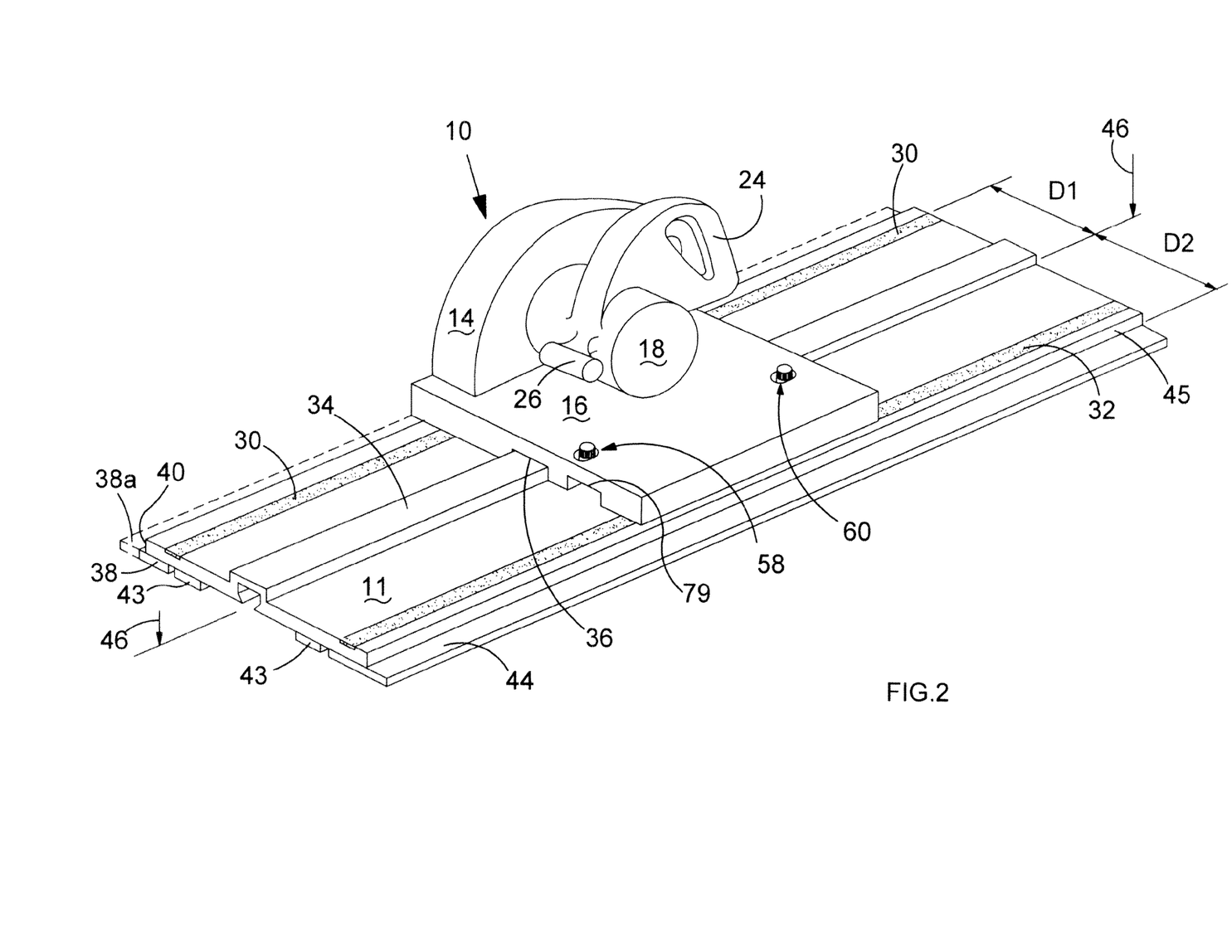
FIG. 2 is a perspective view of the plunge saw upon the guide.

Referring to FIGS. 1 through 4, a power tool in the form of a plunge saw 10 is designed to slide along a guide 11. The plunge saw comprises a motorized circular saw blade 12 and a blade guard 14. The blade 12 and blade guard 14 are both normally substantially perpendicular to a footplate 16, but may be adjusted to be inclined relative to the footplate 16 for the purpose of bevel cutting. The plunge saw body 18 is pivotable in a plane perpendicular to the footplate 16 about a hinge 20 attached to the footplate 16. The blade 12 can be moved between an upper "parked position" 12a inside the blade guard, and a lower "plunged position" 12b protruding below the footplate 16. The blade 12 has an axis 21 about which it rotates when turned by the motor. In use, the blade 12 rotates in the direction of arrow W. Viewed from one end, as is best shown in FIG. 1, the axis 21 follows an arc-shaped path BP as the blade 12 moves between the parked 12a and plunged 12b positions.

The blade 12 is biased into the parked position by a spring 22. In use, a user can push the plunge saw 10 downwardly, via a pair of handles 24, 26, against the spring so that the blade descends towards the plunged position 12b. The exact depth of the plunged position 12b is determined by setting a depth-stop (not shown). When the user releases the handles 24, 26 the blade 12 springs back to the parked position 12a.

The user can also push the plunge saw 10 forwardly, again via the handles 24, 26, so that the footplate 14 slides along the guide 11 to ensure that the blade 12 cuts a straight line. The guide 11 is made of strong material, such as, metal. The sliding motion of the tool 10 on the guide 11 is assisted by a pair of low-friction strips 30, 32 located on the upper surface of the guide 11.

The guide 11 has a straight rail 34 on its upper surface and the footplate has a substantially correspondingly-shaped middle channel 36 in its lower surface. Engagement between rail 34 and middle channel 36 guides the footplate as it slides along the guide. In order to ensure a linear cut in the workpiece 42, the plunge saw 10 is positioned on the guide 11 which is placed upon the workpiece 42, rather than the plunge saw being positioned directly onto the workpiece 42.

A guide lip 38, made of trimmable material, like, for example, hard rubber, is located beneath a long side face 40 of the guide 11. When new, the guide lip 38 is oversized to be wider than the distance X between an inner surface 112 of the blade 12 and the long side face 40 of the guide. The first cut with blade 12 severs an outer margin 38a of the guide lip 38. What remains of the guide lip touches the blade. In other words, there is no gap between the blade inner surface 112 and the guide lip 38. The guide lip 38 is thereby matched to suit the blade 12 which made the first cut.

There are at least two anti-slip strips 43 on the underside of the guide 11. Each anti-slip strip 43 has the same thickness as the guide lip 38 so that the guide is evenly supported when upon a workpiece 42.

Figure 4:
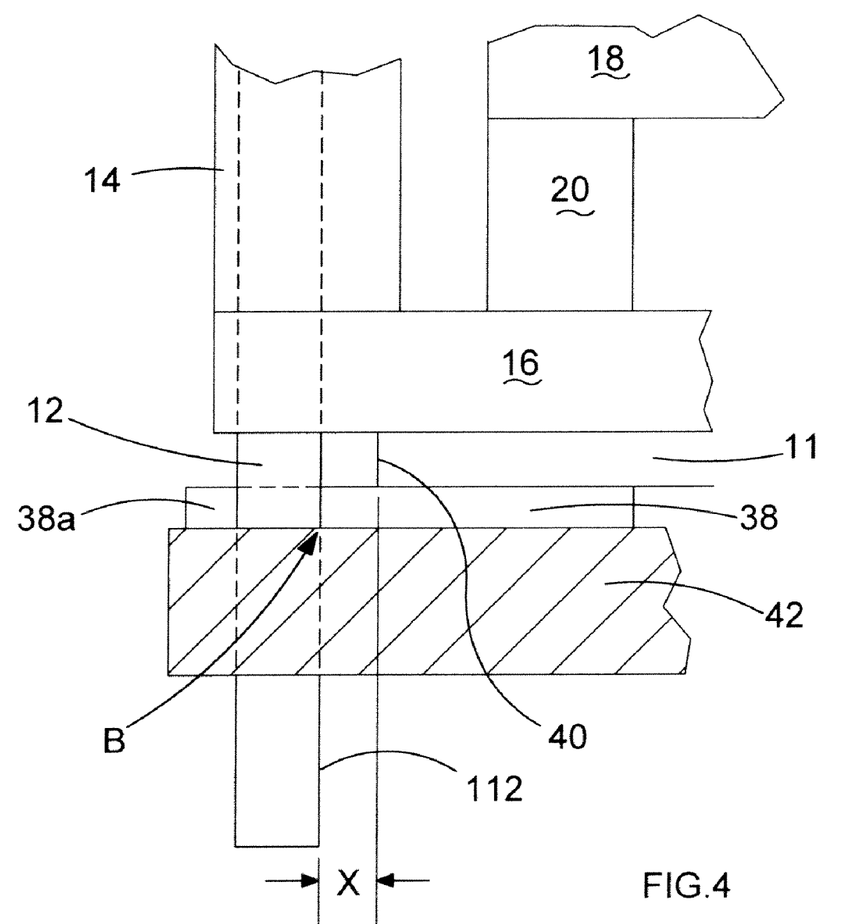
FIG. 4 is a front view of detail A shown in FIG. 3.

The region where guide lip 38, blade 12 and workpiece 42 meet is shown in detail in FIG. 4. Downward pressure caused by the weight of the plunge saw 10 and the guide 11 is applied through the anti-slip strips 43 and the guide lip 38 upon the workpiece 42 to hold the guide 11 in place. The downward pressure at the guide lip 38 provides downward support adjacent the blade 12 which counteracts any tendency of the upward sweep of the rotating blade 12 to splinter the upper surface of the workpiece 42 in the region of the arrow B. This leads to a much cleaner cut in the workpiece 42. The downward pressure can be increased, if necessary, by clamping the guide 11 to the workpiece 42.

Whenever the blade 12 is replaced the guide lip 38 should, preferably, be renewed and matched to the replacement blade to ensure that a clean cut is maintained. Spare guide lips can be easily fixed to the underside of the guide by adhesive.

A second guide lip 44, also made of trimmable material, like, for example, hard rubber, is located on the opposite long side face 45 of the guide. The second guide lip 44 has the same thickness as the guide lip 38 and the rubber strips 43.

The rail 34 is located in the central longitudinal plane 46 of the guide. The middle channel 36 is arranged so that when the plunge saw 10 is rotated about 180° the blade 12 overhangs the opposite long side face 45 by approximately the same distance X to perform the cutting action on that opposite side. The second guide lip 44 is oversized to be wider than the distance X. The first cut by blade 12 severs an outer margin of the second guide lip 44 and what remains is thereby matched to the blade 12.

When the blade 12 is replaced, but a spare guide lip is not available, or there is no time to renew it, the second guide lip 44 can be used as a back-up resource. The plunge saw 10, or guide 11, is simply rotated 180° prior to use.

Alternatively, both guide lips can be deliberately matched to suit a particular blade so that both sides of a workpiece can be cut simply by rotating the plunge saw 180°, rather than the rotating both the plunge saw and guide. This is an advantage when the guide is particularly long and cumbersome, like, for example, when several guides are coupled together.

Periodically, the work environment dictates that an unsupported portion of a workpiece be cut. While the guide 11 is relatively strong, it does, when unsupported, bow downwards under a bending moment caused by the weight of the plunge saw 10 resting thereupon. For example, when the user approaches the final stage of a cut, the plunge saw rests upon an unsupported portion of the guide as it passes beyond the end of the workpiece.

Figure 3:
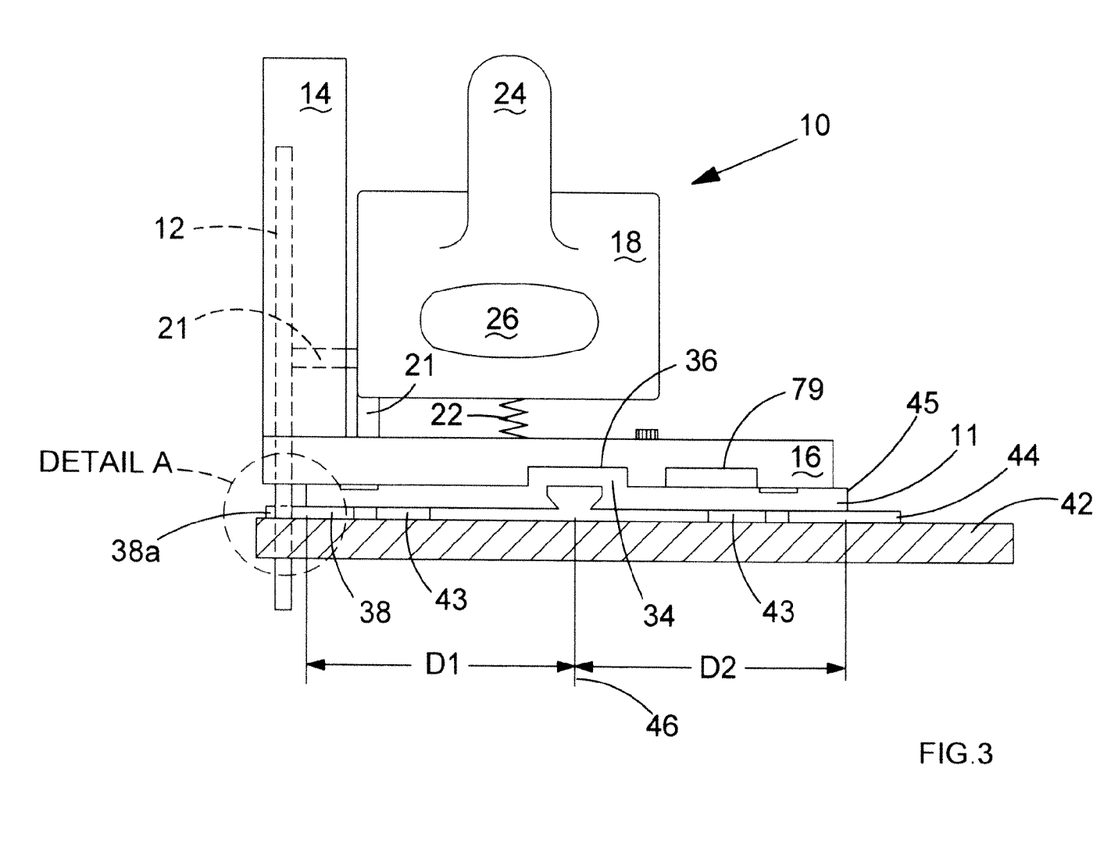
FIG. 3 is a front view of the plunge saw and guide of FIG. 2.

Referring in particular to FIG. 3, the guide 11 is substantially symmetrical when viewed from one end because the central longitudinal plane 46 bi-sects the central rail 34 of the otherwise planar guide i.e. distance D1=distance D2. The guide 11 tends to bow uniformly when unsupported with the plunge saw 10 rested thereupon. The blade 12 maintains its inclination with respect to the workpiece 42. Thus, provided that the distance bowed downward is not significant, an accurate cut can be finished without need to stop work and alter the guide 11 support system.

Figure 5:
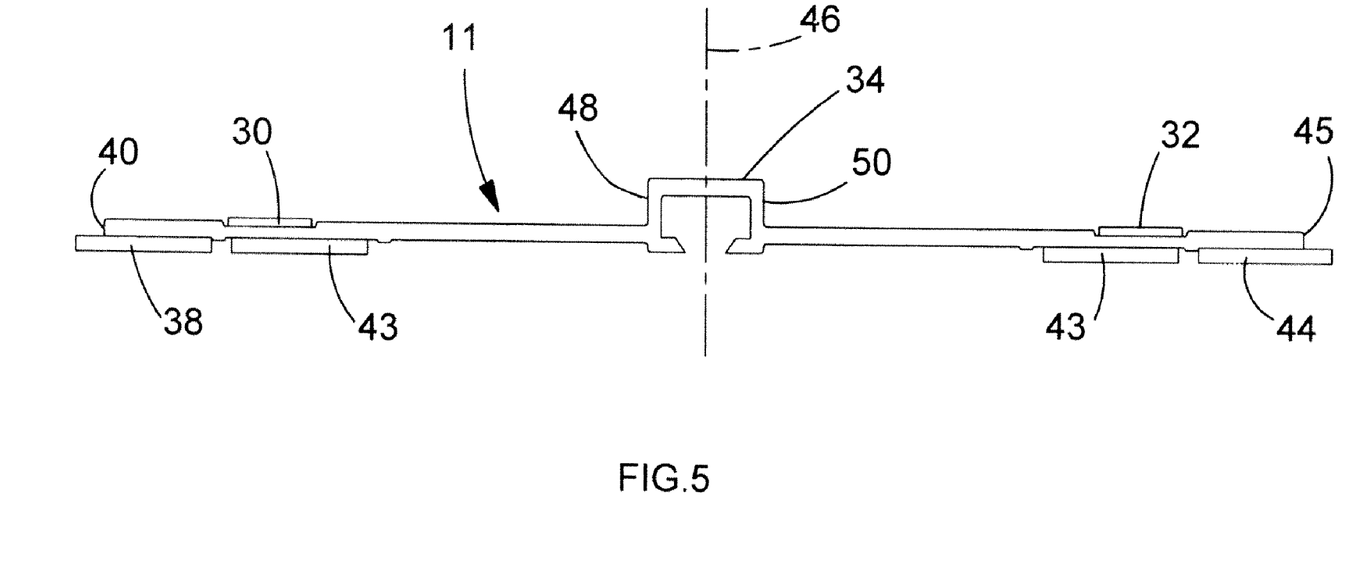
FIG. 5 is an end view of the guide.

Referring to FIG. 5, the rail 34 has two outward facing sides 48, 50 which stand parallel to the longitudinal plane 46.

Figure 6:
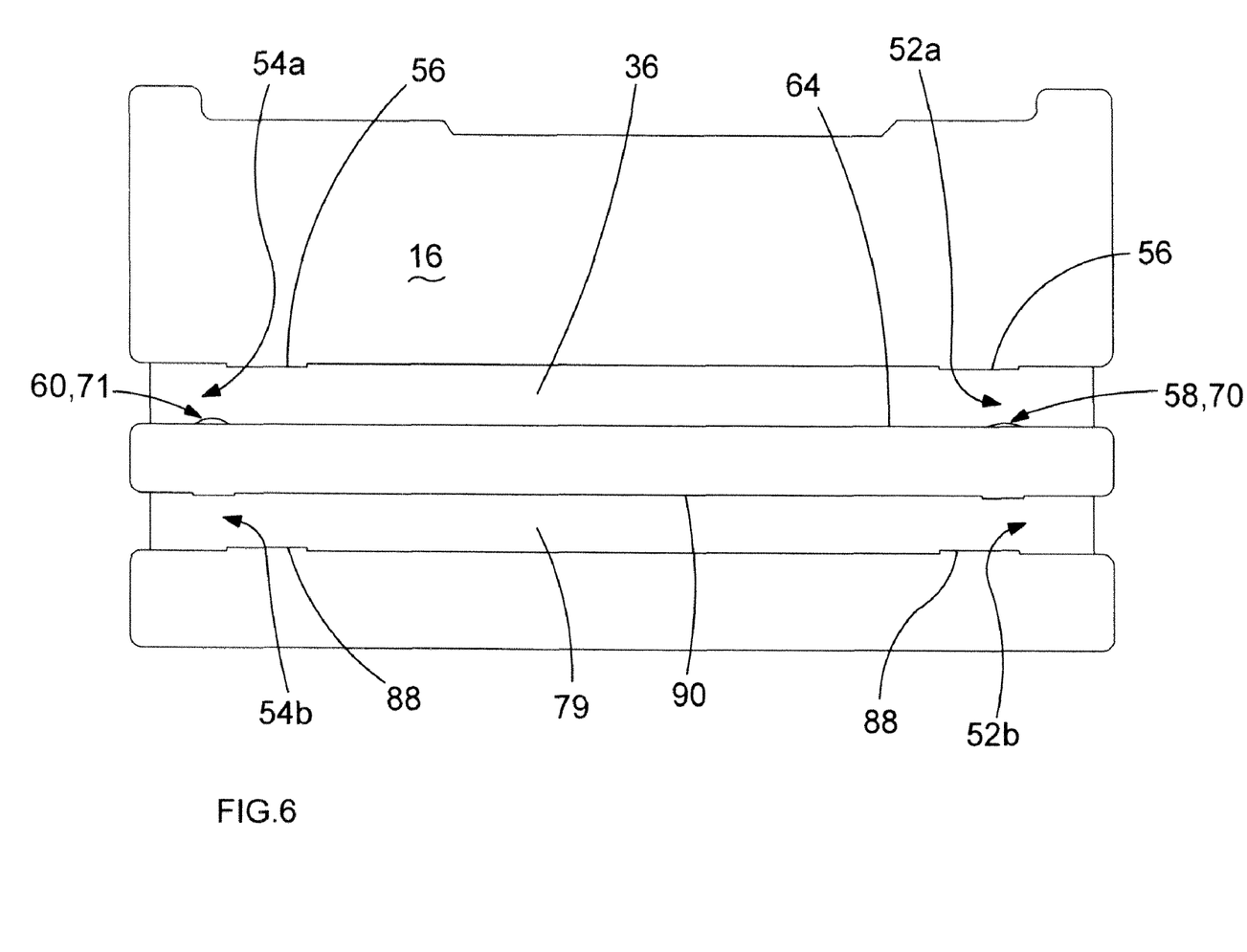
FIG. 6 is an underside view of a footplate of the plunge saw.

Referring to FIG. 6, the middle channel 36 includes the first parts 52a, 54a of two adjustable dual-restrictions. The two dual-restrictions are spaced apart in the longitudinal direction.

Figure 7:
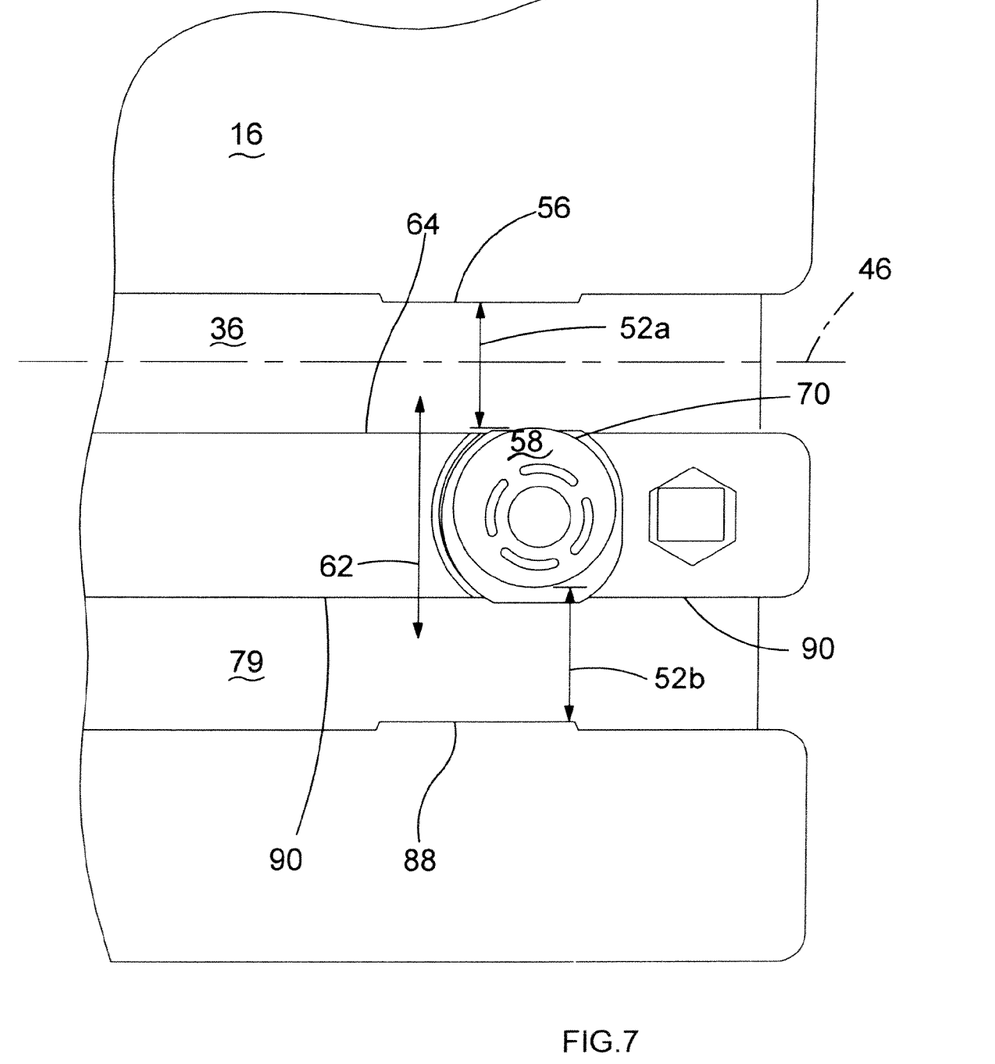
FIG. 7 is cross-sectional view VII-VII in FIG. 8 of an adjustable mechanism in the form of an eccentric element.
Figure 8:
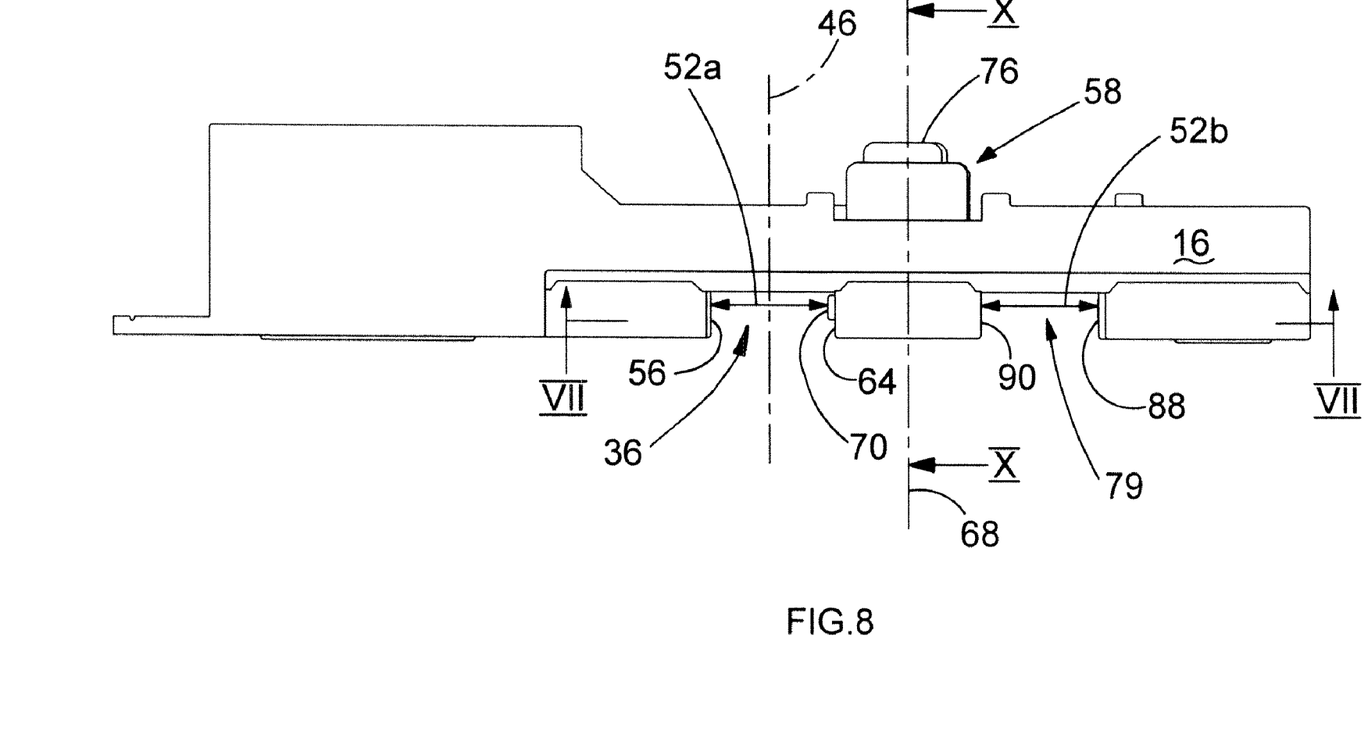
FIG. 8 is an end view of the footplate.

Referring to FIGS. 6 through 8, the first part of dual-restriction 52a is defined by an inward facing fixed side wall 56 in the middle channel 36 and by an eccentric element 58. The eccentric element 58 may be rotated so that the width of the first part of dual-restriction 52a, measured in a direction 62 transverse to the longitudinal plane 46, is adjusted. The first part of other dual-restriction 54a is also defined by a corresponding fixed side wall 56 and an identical eccentric element 60. The eccentric element 60 may also be rotated so that the width of the first part of other dual-restriction 54a, measured in transverse direction 62, is adjusted. The eccentric elements 58, 60 perform the role of the 'adjustment mechanism'.

When the footplate 16 is positioned on the guide 11 the rail 34 passes through the first parts 52a, 54a of the dual-restrictions. In this way, the side wall 48 of the rail 34 slides against the fixed face 56 in the middle channel 36 and the opposite side wall 50 of the rail 34 slides against the eccentric elements 58, 60.

Referring to FIGS. 6 and 7, the middle channel 36 has another inward facing side wall 64, opposite the fixed side wall 56, which is interrupted by the eccentric elements 58, 60. Since the footplate 11 is guided only at the first parts 52a, 54a of the dual-restrictions, the distance between the fixed side wall 56 and the interrupted side wall 64 is no longer significant, except that this distance must be greater, at least by a small amount, than the width of the rail 34.

Since the widths of the first parts 52a, 54a of the dual-restrictions may be adjusted in the transverse direction 62, the clearance between guide 11 and the footplate 16 may be adjusted so that the footplate is guided without wobbling, as it were, in an exactly linear manner in the longitudinal direction. As such, it is also possible to compensate for manufacturing tolerances of the parts of the footplate.

When the footplate 16 is positioned on the guide 11, the widths of the first parts 52a, 54a of dual-restrictions may be slightly greater than necessary. The eccentric elements 58, 60 are then rotated, as described in more detail below, so that the rail 34 is located within the middle channel 36 without clearance.

Note that, in principle, it would be sufficient to provide an adjustable dual-restriction at only one point along the channel, which would probably have to be located in the central region of the footplate. More than two such adjustable dual-restrictions may also be provided. However, two adjustable dual-restrictions, one located at each longitudinal end of the footplate's channel, are particularly expedient.

Figures 9, 10:
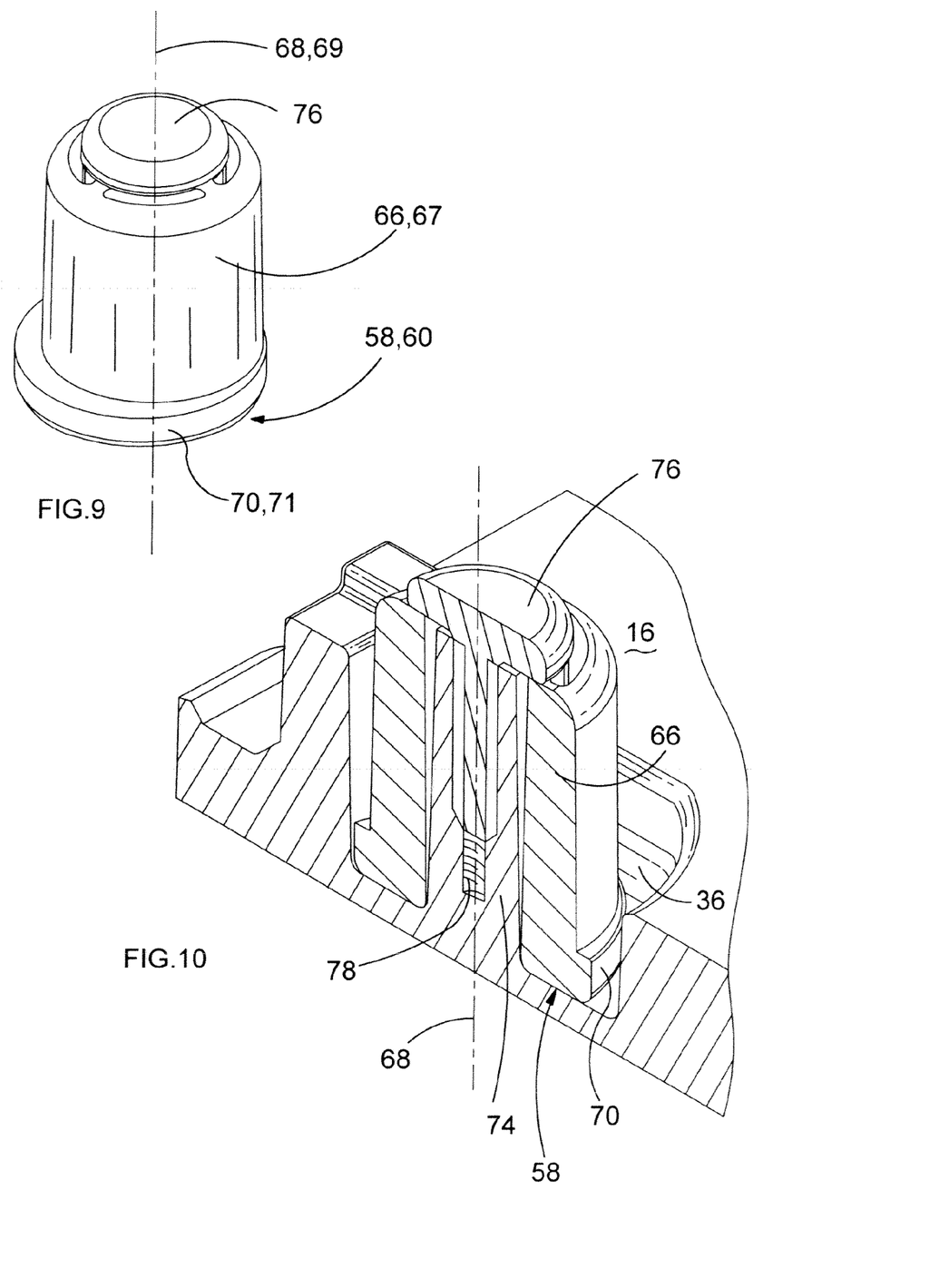
FIG. 9 is a perspective view of the eccentric element.
FIG. 10 is cross-sectional view X-X in FIG. 8 of the eccentric element mounted upon the footplate.

Referring to FIG. 9, each eccentric element 58, 60 is coupled with a respective guide wheel 66, 67. Each eccentric element 58, 60 is also disposed on the footplate 16 so that it may rotate about its own axis of rotation 68, 69. Both axes of rotation 68, 69 are perpendicular to the plane of the footplate 16. Each eccentric element 58, 60 has a cylindrical circumferential surface 70, 71 which is eccentric to its respective axis of rotation 68, 69. Rotation of a guide wheel 66, 67 by the plunge saw user results in rotation of a respective eccentric element 58, 60.

As is shown in FIG. 8, rotation of the eccentric element 58 results in its circumferential surface 70 selectively protruding, to a greater or lesser extent, through the interrupted side wall 64 and towards the fixed side wall 56. Accordingly, the width of the first part 52a of the dual-restriction, measured in the transverse direction 62, is adjustable by rotation of the eccentric element 58.

In order to improve grip of the guide wheels 66, 67, which are to be grasped manually, they may be provided on their outer circumference with a ribbing, or the like. Each eccentric element 58, 60 may be integral with a respective guide wheel 66, 67.

Figure 11:
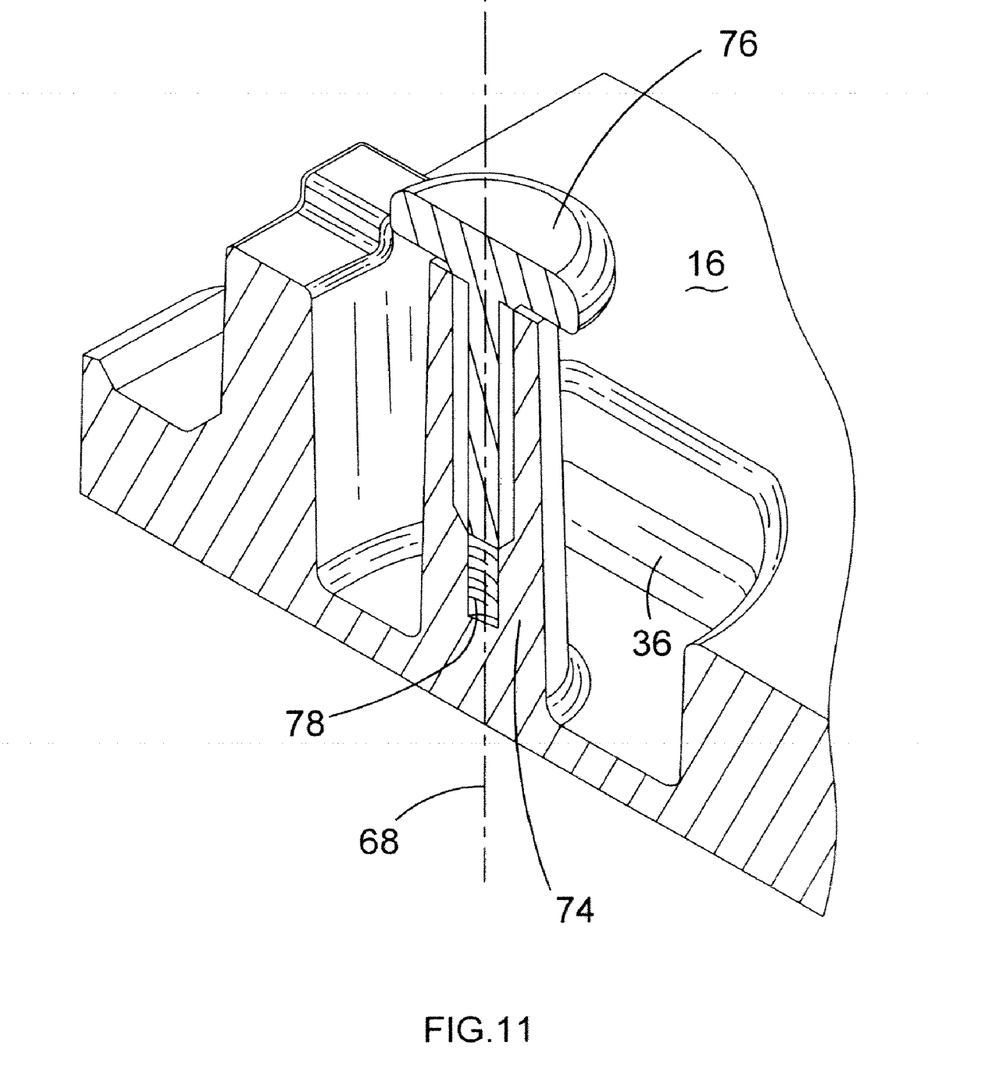
FIG. 11 is the same cross-sectional view as FIG. 10 without the eccentric element.

FIGS. 10 and 11 show how the eccentric element 58 is secured to a bearing portion 74 of the footplate 16 by a fixing bolt 76 passing through the middle of the eccentric element 58. The bearing portion 74 has a threaded hole 78 into which the threaded fixing bolt 76 is screwed. The hole 78, the fixing bolt 76 and the axis of rotation 68 of the eccentric element 58 are concentric. To enable rotation of the eccentric element 58, the user unfastens the fixing bolt 76. When the eccentric element 58 has been rotated to the extent necessary to adjust the width of the first 52a or second 52b parts of the dual-restriction, the user re-fastens the fixing bolt 76 to immobilize the eccentric element 58 against further rotation. The eccentric element 60 is secured to a corresponding bearing portion 74 of the footplate in exactly the same way as eccentric element 58.

Figure 12:
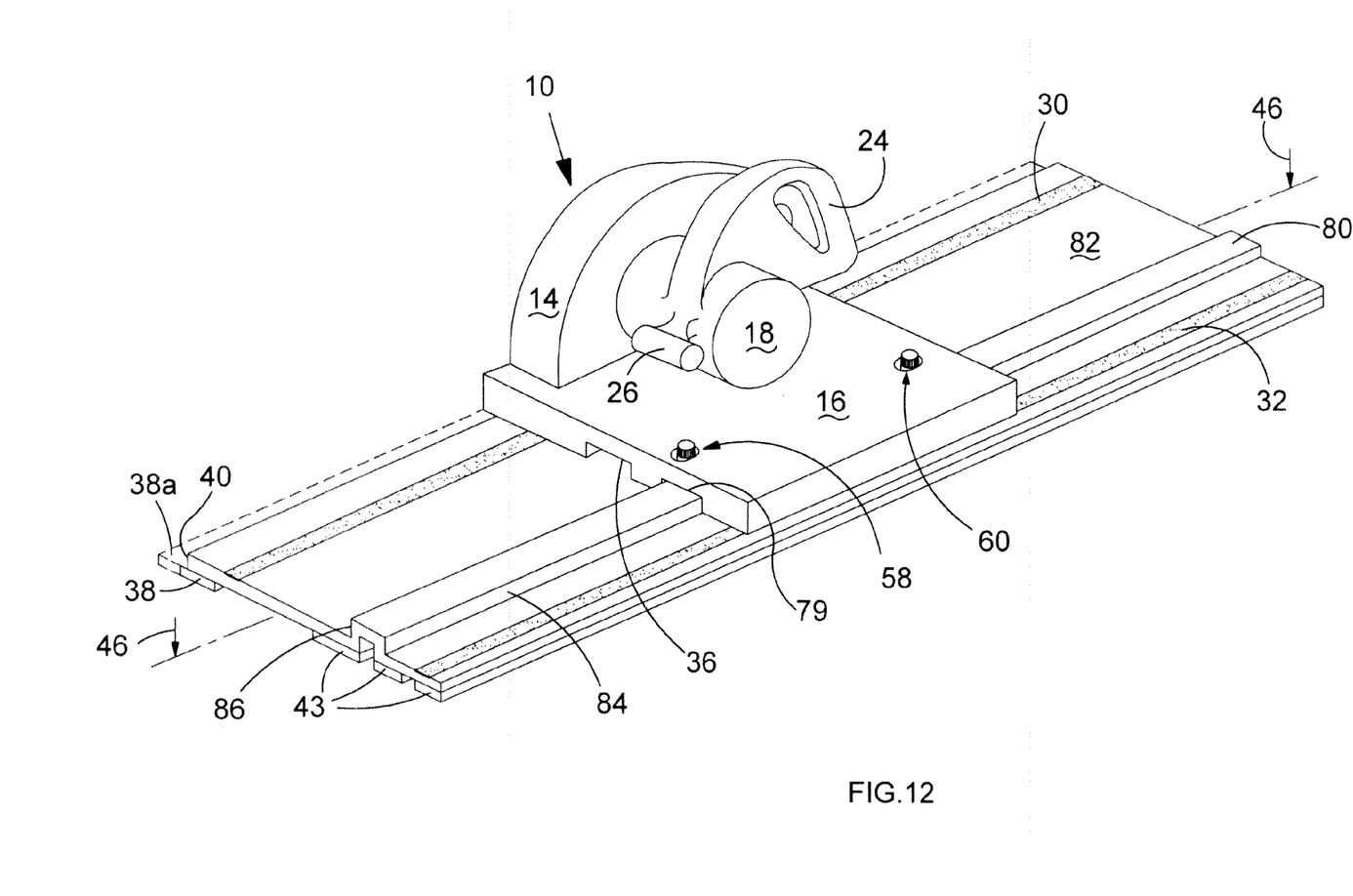
FIG. 12 is a perspective view of the plunge saw upon a second different guide.

Referring to FIGS. 8 and 12, the footplate 16 also has a side channel 79 for engagement with a rail 80 of an alternative guide 82. Features of the alternative guide 82 common with the guide 11 are numbered the same. However, the alternative guide 82 is not symmetrical when viewed from one end because the rail is located on one side of the longitudinal central plane 46. The guide 82 is stiffer on one side of the rail 80 and so it tends to bow in a skewed manner when unsupported. In these circumstances, the plunge saw 10 and the blade 12 will tilt to one side when the plunge saw 10 is upon unsupported guide. The user must stop work and alter the support system of the guide 82 to maintain an accurate cut.

In order to ensure a linear cut in the workpiece, the plunge saw 10 is positioned onto the guide 82 which is placed upon the workpiece, rather than the plunge saw being placed directly onto the workpiece. The rail 80 has two outward facing side walls 84, 86 which stand parallel to the longitudinal plane 46.

Referring to FIGS. 6 and 7, the side channel 79 includes the second parts 52b, 54b of the two adjustable dual-restrictions. Each second part 52b, 54b of the dual-restrictions is defined by a fixed side wall 88 in the side channel 79 and by the same eccentric element 58, 60 as is used to adjust the first parts 52a, 54a of the dual-restrictions of the middle channel 36. Each eccentric element 58, 60 is rotatable 360° to enable adjustment, measured in the transverse direction 62, of the width of the second parts 52b, 54b of the dual-restrictions.

When the footplate 16 is positioned onto the guide 82, the rail 80 passes through the second parts 52b, 54b of the dual-restrictions. In this way, the side 84 of the rail 80 slides against the fixed side wall 88 of the side channel 60 and the opposite side 86 of the rail 80 slides against the eccentric elements 58, 60.

Referring to FIGS. 6 and 7, the side channel 79 has another inward facing side wall 90, opposite the fixed side wall 88, which is interrupted by the eccentric elements 58, 60. Since the footplate 82 is guided only at the second parts 52b, 54b of the adjustable dual-restrictions, the distance between the fixed side wall 88 and the interrupted side wall 90 is also not significant, except that this distance must be greater, at least by a small amount, than the width of the rail 80.

Since the widths of the second parts 52b, 54b of the dual-restrictions may be adjusted in the transverse direction 62, the clearance between guide 82 and the footplate 16 may be adjusted so that the footplate 16 is again guided without wobbling, as it were, in an exactly linear manner.

When the footplate 16 is positioned on the guide 82, the widths of the second parts 52b, 54b of the dual-restrictions may be slightly greater than necessary. The eccentric elements 58, 60 are then adjusted, as has already been described in detail above, so that the rail 80 is located within the side channel 79 without clearance.

The eccentric elements 58, 60 are the same as described above and, upon rotation, the cylindrical circumferential surface 70, 71 of the eccentric element selectively protrudes, to a greater or lesser extent, through the interrupted side wall 90 and towards the fixed side wall 88, due to the eccentricity of the of the circumferential surface. Accordingly, the width of the second parts 52b, 54b of the dual-restrictions, measured in the transverse direction 62, is also adjustable by rotation of the eccentric elements 58, 60.

Figure 13:
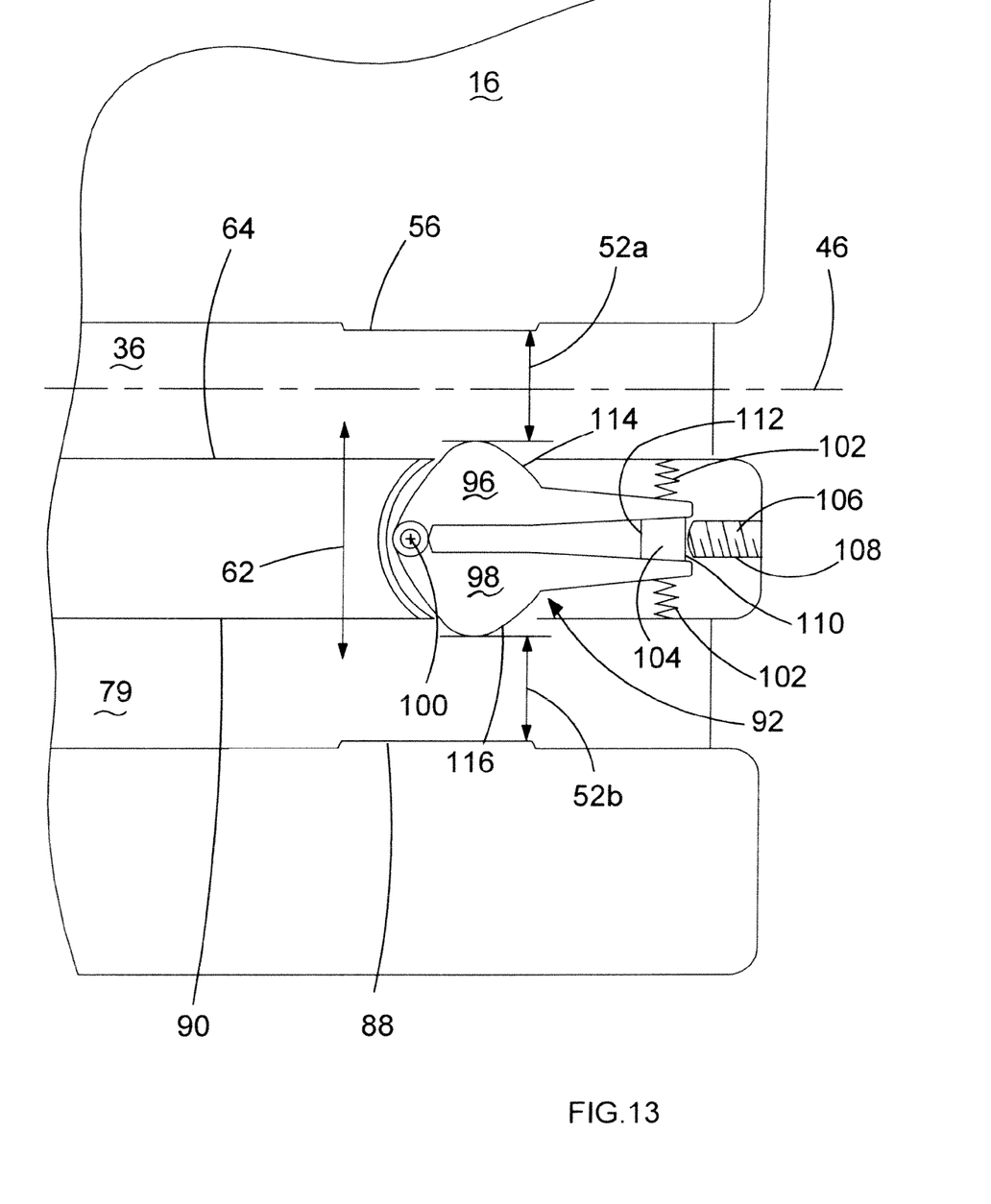
FIG. 13 is a cross-sectional view VII-VII in FIG. 8 with an alternative adjustment mechanism.

Referring to FIG. 13, an alternative to the eccentric elements 58, 60 is shown in the form of an adjustment mechanism 92. Like the eccentric elements 58, 60, there is an adjustment mechanism located at each end of the footplate and both between the middle 36 and the side 79 channels. Only one alternative adjustment mechanism 92 is shown, but they both work in fundamentally the same way.

The alternative adjustment mechanisms 92 each comprise two pivot arms 96, 98 each arranged at one end to pivot about a common pivot 100 located in the footplate 16 so that an open mouth may be formed at the other ends of the arms. The arms are biased to pivot towards each other by a pair of helical springs 102. The helical springs can be substituted by anything capable of being located within the confines of the footplate, like, for example, a leaf spring or a rubber bush.

Each adjustment mechanism 92 further comprises a wedge 104 slideable along a straight track (not shown) in the footplate 16 which is parallel to the longitudinal plane 46. The wedge is controlled by a grub-screw 106 disposed in an adjacent end face of the footplate. The grub-screw cooperates with a threaded hole in 108 in the footplate. The track is aligned with the grub-screw and is directed towards the common pivot. The track ensures that the wedge is moveable back and forth between the arms but not laterally towards either of the central 36 and the side 79 channels. One end of the grub-screw engages a major end face 110 of the wedge. A minor end face 112 of the wedge is always disposed in the mouth between the arms.

Each arm 96, 98 has a shoulder 114, 116 which can be made to protrude through the interrupted side faces 64, 90 of the central 36 and the side 79 channels, respectively. When the grub-screw is driven by a screwdriver into the footplate the wedge forces the arms to pivot away from each other and against the bias of the springs. The shoulders thus protrude into the central 36 and side 79 channels the extent necessary to select the optimum width, measured in the transverse direction 62, of the first part 52a and the second part 52b of the dual-restriction.

If clearance needs to be increased the grub-screw is driven out of the footplate to the extent necessary. The bias of the springs forces the wedge to follow the grub-screw so that the s arms pivot towards each other and the shoulders retract through the interrupted side faces 64, 90 of the central 36 and the side 79 channels, respectively.

Readjustment to increase or decrease play may be performed whenever necessary.

The invention claimed is:

1. A footplate for a power tool, the footplate comprising:
   a first channel extending along a lower surface of the footplate, the first channel having a fixed wall and configured and dimensioned to receive a first rail extending along an upper surface of a first guide;
   a second channel extending along a lower surface of the footplate, the second channel having a fixed wall and configured and dimensioned to receive a second rail extending along an upper surface of a second guide, and
   at least one adjustment mechanism having a first part and a second part, the first part of the adjustment mechanism extends into the first channel and the second part of the adjustment mechanism extends into the second channel,
   wherein the first part of the adjustment mechanism has a first adjustable side wall arranged opposite to the fixed wall in the first channel,
   wherein the second part of the adjustment mechanism has a second adjustable side wall arranged opposite to the fixed wall in the second channel.

2. The footplate of claim 1, wherein the first adjustable side wall and the fixed wall in the first channel are configured to engage the first rail of the first guide and the second adjustable side wall and the fixed wall in the second channel are configured to engage the second rail of the second guide.

3. The footplate of claim 1, wherein the width between the fixed wall in the first channel and the first adjustable side wall, measured in a direction transverse to a longitudinal direction, is adjustable by the adjustment mechanism.

4. The footplate of claim 1, wherein the width between the fixed wall in the second channel and the second adjustable side wall, measured in a direction transverse to a longitudinal direction, is adjustable by the adjustment mechanism.

5. The footplate of claim 1, wherein the first channel has another fixed wall and the first adjustable side wall is located between the fixed side walls of the first channel.

6. The footplate of claim 1, wherein the second channel has another fixed wall and the second adjustable side wall is located between the fixed side walls of the second channel.

7. The footplate of claim 1, wherein the adjustment mechanism comprises a rotatable eccentric element having an axis of rotation.

8. The footplate of claim 7, wherein the first and second adjustable side walls are cylindrical walls arranged eccentrically in relation to the axis of rotation of the eccentric element.

9. The footplate of claim 7, wherein the eccentric element is secured to the footplate by a securing member connected to a bearing portion of the footplate and wherein the securing member can be adjusted to enable or disable rotation of the eccentric element.

10. The footplate of claim 7, wherein the adjustment mechanism comprises a manually accessible actuating member for rotating the eccentric element.

11. The footplate of claim 7, wherein the eccentric element can be rotated substantially 360°.

12. The footplate of claim 1, wherein the adjustment mechanism comprises:
- two arms, each arm arranged at one end to pivot about a common pivot point; and
- a wedge arranged to move between the arms, the wedge being movable by a control device,
- wherein movement of the wedge between the arms in a first direction forces the arms to pivot apart to reduce the width between the fixed wall in the first channel and the first adjustable side wall as well as reduce the width between the fixed wall in the second channel and the second adjustable side wall, and
- wherein movement of the wedge in a second direction allows the arms to pivot closer to each other to increase the width between the fixed wall in the first channel and the first adjustable side wall as well as increase the width between the fixed wall in the second channel and the second adjustable side wall.

13. The footplate of claim 12, wherein the control device is a grub-screw threadedly engaged with an externally accessible hole in the footplate, whereby rotation of the grub-screw into the footplate moves the wedge in the first direction and whereby rotation of the grub-screw out of the footplate allows the wedge to in the second direction.

14. The footplate of claim 12, wherein each arm is biased to pivot towards the other arm.

* * * * *